United States Patent
Hu et al.

(10) Patent No.: US 12,028,356 B2
(45) Date of Patent: Jul. 2, 2024

(54) DETECTION DEVICE, DETECTION METHOD, AND DETECTION PROGRAM

(71) Applicant: NIPPON TELEGRAPH AND TELEPHONE CORPORATION, Tokyo (JP)

(72) Inventors: Bo Hu, Musashino (JP); Kazunori Kamiya, Musashino (JP); Shohei Araki, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 289 days.

(21) Appl. No.: 17/616,693

(22) PCT Filed: Jun. 28, 2019

(86) PCT No.: PCT/JP2019/025987
§ 371 (c)(1),
(2) Date: Dec. 6, 2021

(87) PCT Pub. No.: WO2020/261582
PCT Pub. Date: Dec. 30, 2020

(65) Prior Publication Data
US 2022/0311785 A1    Sep. 29, 2022

(51) Int. Cl.
*H04L 9/40*    (2022.01)
*H04L 67/1001*    (2022.01)

(52) U.S. Cl.
CPC ...... *H04L 63/1416* (2013.01); *H04L 67/1001* (2022.05)

(58) Field of Classification Search
CPC ............. H04L 63/1416; H04L 67/1001; H04L 2463/144; H04L 63/1425; H04L 63/1458; G06F 21/55
See application file for complete search history.

(56) References Cited

U.S. PATENT DOCUMENTS

| 9,060,018 B1 * | 6/2015 | Yu ........................... H04L 67/30 |
| 10,701,086 B1 * | 6/2020 | Mushtaq ............. H04L 47/2483 |
| 2016/0261608 A1 * | 9/2016 | Hu ........................... H04L 63/10 |

FOREIGN PATENT DOCUMENTS

JP    2018-169897 A    11/2018

OTHER PUBLICATIONS

Bilge et al., "Disclosure: Detecting Botnet Command and Control Servers Through Large-Scale NetFlow Analysis", 28th Annual Computer Security Applications Conference, Dec. 3-7, 2012, 10 pages.

* cited by examiner

*Primary Examiner* — Trong H Nguyen
(74) *Attorney, Agent, or Firm* — XSENSUS LLP

(57) ABSTRACT

A detection device includes processing circuitry configured to collect communication information in a network including clients and servers, generate a matrix representing states of access from the clients to the servers using the communication information collected, aggregate a plurality of the clients accessing a target server and generate statistical information of similarities between the aggregated clients in the matrix as a feature amount of the target server, learn, with regard to the target server which is a server for which it is known whether the server is a malicious server, a model for determining whether a server is a malicious server using the feature amount generated, and determine, with regard to the target server which is a server for which it is unknown whether the server is a malicious server, whether the target server is a malicious server using the feature amount generated and the model.

6 Claims, 8 Drawing Sheets

| MALICIOUS SERVER ID | IP ADDRESS OF MALICIOUS SERVER |
|---|---|
| 1 | xxx.xxx.xxx.xxx |
| 2 | yyy.yyy.yyy.yyy |
| ⋮ | ⋮ |

Fig. 2

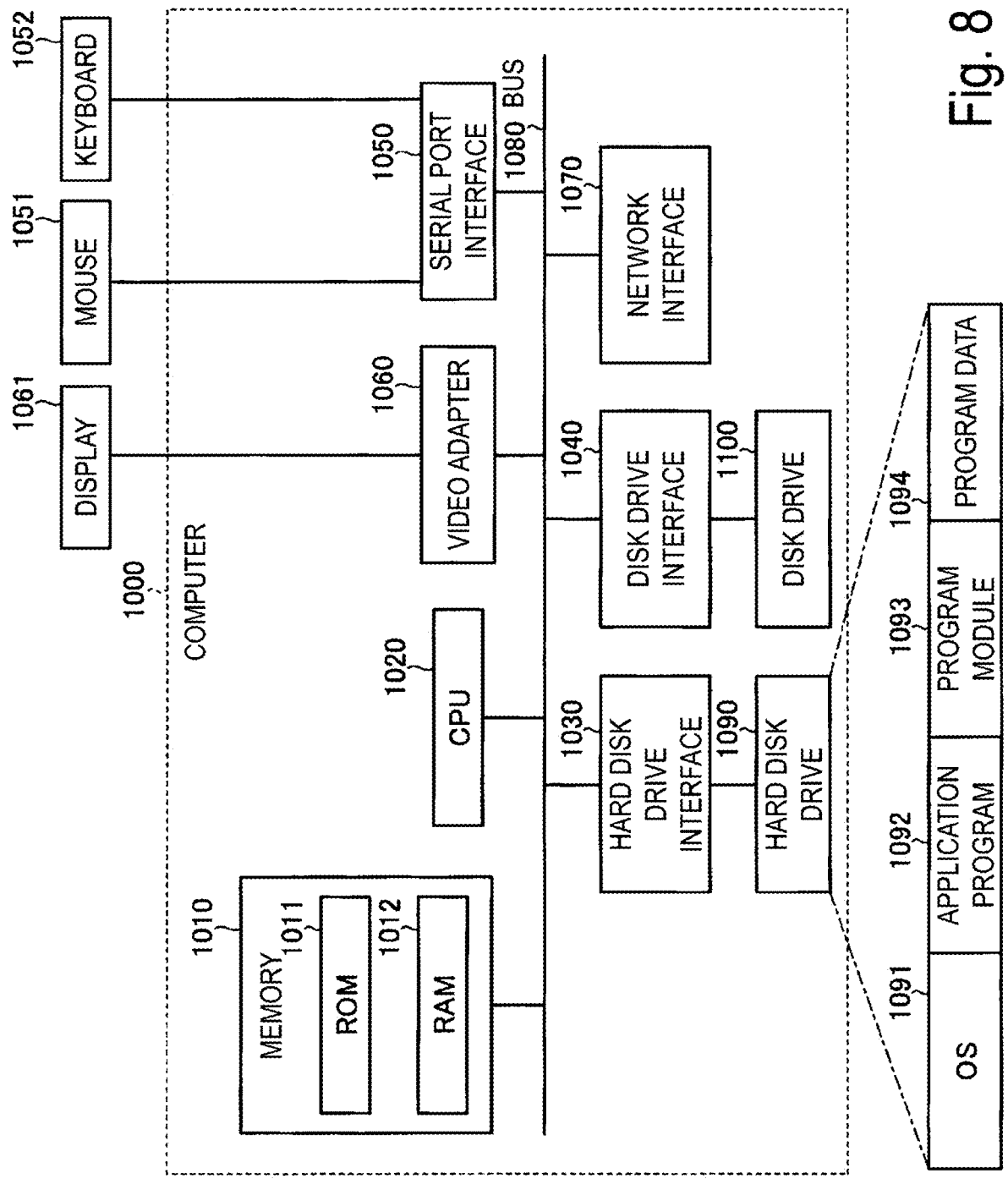

DETECTION DEVICE, DETECTION METHOD, AND DETECTION PROGRAM

CROSS-REFERENCE TO RELATED APPLICATION

The present application is based on PCT filing PCT/JP2019/025987, filed Jun. 28, 2019, the entire contents of which are incorporated herein by reference.

TECHNICAL FIELD

The present invention relates to a detection device, a detection method, and a detection program.

BACKGROUND ART

A botnet is a network in which attack programs that can be remotely operated are sent to many terminals or servers by a computer virus called malware and are made to carry out an attack all at once in response to an external command. This network is formed by a command and control server that gives an attack command and a group of terminals or servers (bots)infected with the attack program. To detect a malicious server such as the command and control server, for example, a supervised learning scheme for detecting a malicious server of a botnet has been used.

CITATION LIST

Patent Literature

Patent Literature 1: JP 2018-169897 A

NON PATENT LITERATURE

Non Patent Document 1: Leyla Bilge, Engin Kirda, Davide Balzarotti, Christopher Kruegel, William Robertson, "DISCLOSURE: Detecting Botnet Command and Control Servers Through Large-Scale NetFlow Analysis", 28th Annual Computer Security Applications Conference, Dec. 3 to 7, 2012.

SUMMARY OF THE INVENTION

Technical Problem

However, there is a problem in that the detection accuracy for detecting a malicious server controlling clients infected with malware cannot be improved. For example, the technology of the related art has a problem in that, when detecting a malicious server using a supervised learning scheme, there are many technologies that focus on client behavior (flow size, access time, and the like) and the detection accuracy for detecting a malicious server becomes insufficient.

Means for Solving the Problem

To solve the above-described problems and achieve an objective of the present invention, a detection device includes: processing circuitry configured to: collect communication information in a network including clients and servers; generate a matrix representing states of access from the clients to the servers using the communication information collected; aggregate a plurality of the clients accessing a target server and generate statistical information of similarities between the aggregated clients in the matrix as a feature amount of the target server; learn, with regard to the target server which is a server for which it is known whether the server is a malicious server, a model for determining whether a server is a malicious server using the feature amount generated; and determine, with regard to the target server which is a server for which it is unknown whether the server is a malicious server, whether the target server is a malicious server by using the feature amount generated unit and the model.

Effects of the Invention

According to the present invention, it is possible to achieve the effect of improving the detection accuracy for detecting a malicious server that controls clients infected with malware.

BRIEF DESCRIPTION OF DRAWINGS

FIG. 2 is a diagram illustrating an example of data stored in a malicious server information storage unit.

FIG. 8 is a diagram illustrating a computer that executes a detection program.

DESCRIPTION OF EMBODIMENTS

Hereinafter, embodiments of a detection device, a detection method, and a detection program according to the present application will be described in detail with reference to the accompanying drawings. The detection device, the detection method, and the detection program according to the present application are not limited to these embodiments.

First Embodiment

In the following embodiment, the configuration of a detection device 10 according to a first embodiment and a flow of processing of the detection device 10 will be described in order, and the effects of the first embodiment will be finally described.

Configuration of Detection Device

Figure 1:
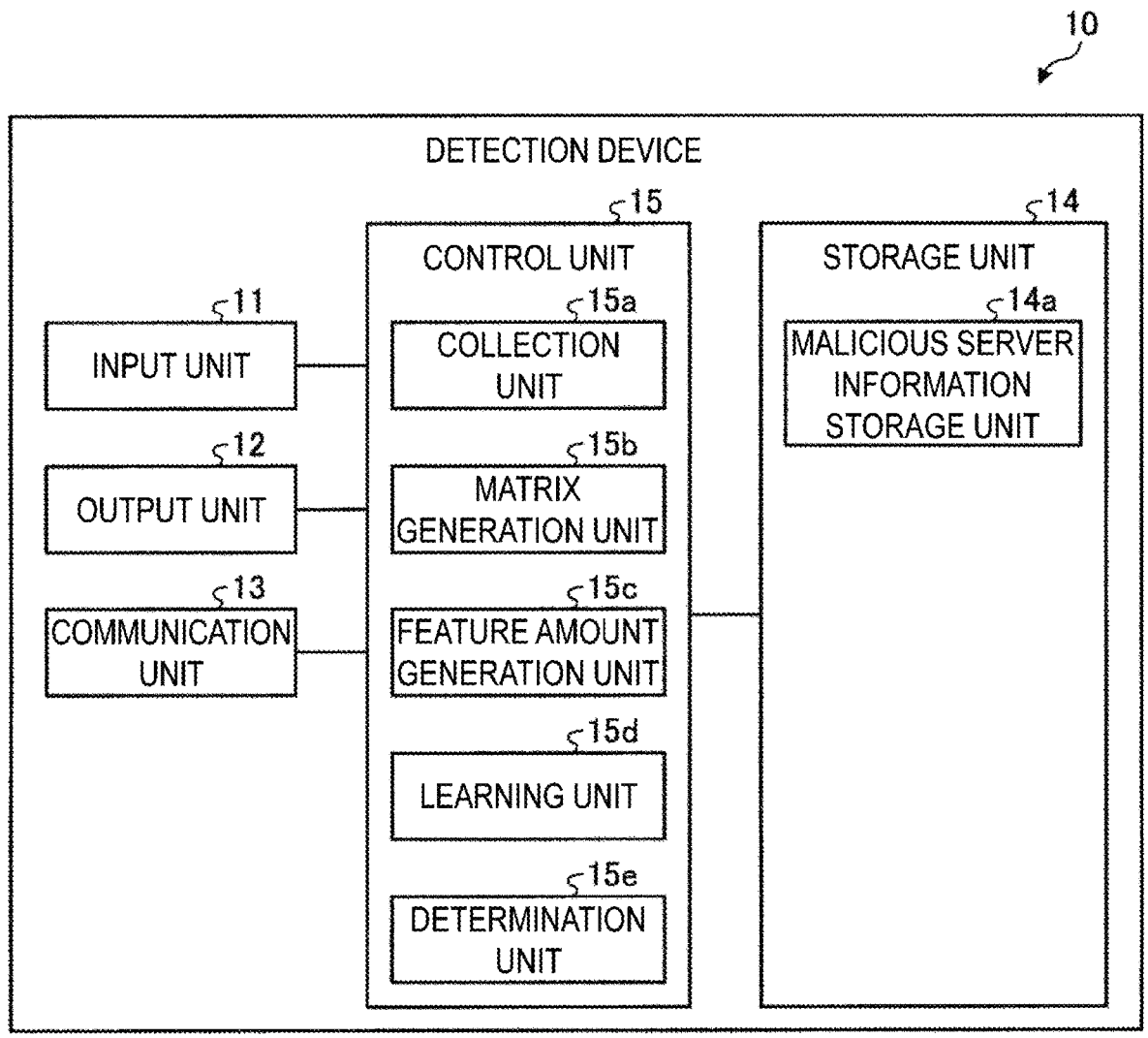
FIG. 1 is a diagram illustrating an example of a configuration of a detection device according to a first embodiment.

First, the configuration of the detection device 10 will be described with reference to FIG. 1. FIG. 1 is a diagram illustrating an example of a configuration of the detection device 10 according to the first embodiment. As illustrated in FIG. 1, the detection device 10 includes an input unit 11, an output unit 12, a communication unit 13, a storage unit 14, and a control unit 15. Hereinafter, processing of each unit included in the detection device 10 will be described.

The input unit 11 is implemented using an input device such as a keyboard, a mouse and the like, and inputs various types of instruction information to the control unit 15 in response to an operator's input operation. The output unit 12 is implemented by a display device such as a liquid crystal display, a printing device such as a printer, an information communication device, a speaker, or the like, and outputs, for example, the IP address of a malicious server to be described below.

The communication unit 13 is a communication interface configured to transmit and receive various pieces of information to and from other apparatuses connected via a network or the like. The communication unit 13 is realized by a network interface card (NIC) or the like and performs communication between other apparatuses and the control unit 15 (which will be described later) via a telecommunication line such as a local area network (LAN) or the Internet. For example, the communication unit 13 receives flow data in the network as an input and outputs the flow data to the control unit 15. For example, the communication unit 13 outputs an IP address or the like of a malicious server detected by the control unit 15 to an external counterattack device or the like.

In addition, the storage unit 14 stores data and programs required for various processing operations performed by the control unit 15. The storage unit 14 includes a malicious server information storage unit 14a. For example, the storage unit 14 is a semiconductor memory element such as a random access memory (RAM) or a flash memory, a storage device such as a hard disk or an optical disc, or the like.

The malicious server information storage unit 14a stores an IP address of a malicious server detected through detection processing to be described below. For example, the malignant server information storage unit 14a stores a "malicious server ID" that uniquely identifies a malicious server and an "IP address of the malicious server" indicating an IP address of the detected malicious server in association, as exemplified in FIG. 2.

Here, the malicious server is assumed to be a command and control (C&C) server that distributes a malicious execution file (malware) or gives commands to bots infected with malware. However, the present invention is not limited thereto and the detection device 10 may detect a malicious server other than a command and control server.

The control unit 15 has an internal memory for storing programs and required data in which various processing procedures and the like are defined, and executes various processing operations therethrough. For example, the control unit 15 is an electronic circuit such as a central processing unit (CPU) or a micro processing unit (MPU), or an integrated circuit such as an application specific integrated circuit (ASIC) or a field programmable gate array (FPGA). The control unit 15 includes a collection unit 15a, a matrix generation unit 15b, a feature amount generation unit 15c, a learning unit 15d, and a determination unit 15e.

The collection unit 15a collects communication information in a network including clients and servers. For example, the collection unit 15a collects flow data output from the communication unit 13 in the network. Here, the flow data is assumed to include, for example, a transmission source IP address, a destination IP address, a transmission source port number, a destination port number, a protocol, and a flag. The collection unit 15a may collect the flow data at any timing, collect the flow data periodically at predetermined intervals, or collect the flow data when a predetermined condition is satisfied.

The matrix generation unit 15b generates a matrix representing states of access from clients to servers from communication information collected by the collection unit 15a. For example, the matrix generation unit 15b generates a matrix in accordance with whether or not clients have accessed each server. The scheme for generating the matrix is not limited thereto. For example, the matrix may be generated in consideration of the number of clients which access the servers, the number of times the clients access the servers, or the like.

For example, the matrix generation unit 15b may compute a global significance of each server using the number of clients accessing the server, compute a local significance of each server with respect to each client using the number of accesses to each server for each of the clients, and generate a matrix in accordance with the global significance and the local significance. The matrix generation unit 15b computes the global significance such that the global significance decreases for a server for which the number of clients accessing the server is larger and computes the local significance such that the local significance increases for a server for which the number of accesses is larger. Any computation scheme may be used as a scheme for computing the global significance and the local significance.

The feature amount generation unit 15c aggregates a plurality of clients that have accessed a target server and generates statistical information of similarities between the aggregated clients in the matrix as a feature amount of the target server. For example, the feature amount generation unit 15c sets two clients accessing the same target server as one pair, computes a correlation coefficient for the matrix representing states of access from the two clients to the server for each pair, and computes a statistical value of the correlation coefficients of the plurality of pairs of clients as a feature amount of the server. Then, when a server is a server for which it is known whether the server is a malicious server or a non-malicious server, the feature amount generation unit 15c assigns, to the feature amount, a label indicating that the feature amount is related to a malicious server or a non-malicious server and outputs the feature amount to the learning unit 15d. The detection device 10 knows whether a server is a malicious server or a non-malicious server.

For example, the feature amount generation unit 15c generates a communication feature amount of a malicious server from communication information of the malicious server and each client and generates a communication feature amount of a server 1 which is a non-malicious server from communication information of the non-malicious server and each client 2. Then, the feature amount generation unit 15c assigns, to the communication feature amount, label information indicating whether the communication feature amount is related to a malicious server or a non-malicious server and outputs the communication feature amount to the learning unit 15d.

Figure 3:
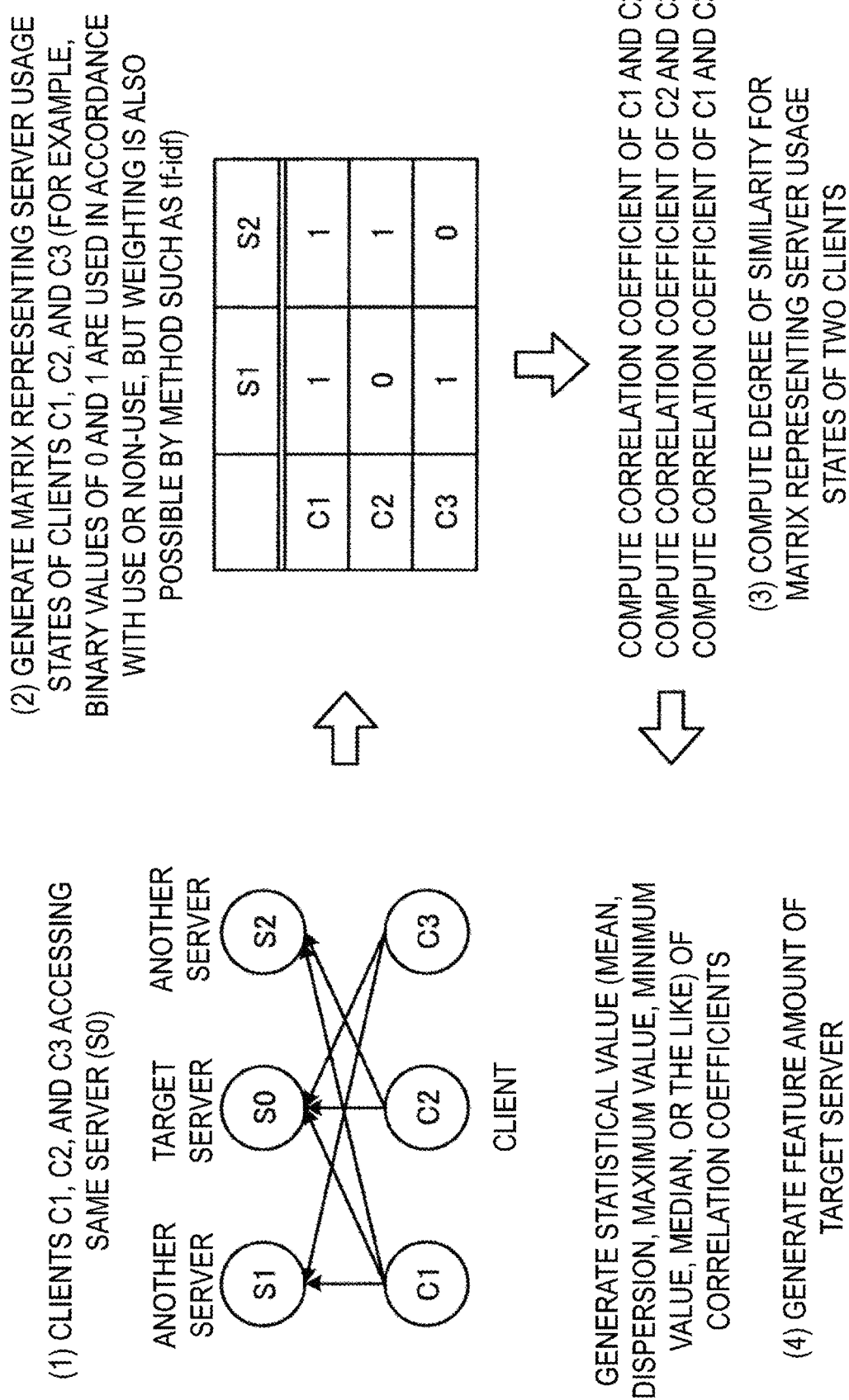
FIG. 3 is a diagram illustrating examples of processing of generating a matrix representing a server usage situation of clients and processing for generating a feature amount of a target server.

Here, examples of processing for generating a matrix representing server usage states of clients and processing for generating a feature amount of a target server will be described with reference to FIG. 3. FIG. 3 is a diagram illustrating examples of processing for generating a matrix representing server usage states of clients and processing for generating a feature amount of a target server. As exemplified in FIG. 3, the matrix generation unit 15b aggregates a plurality of clients C1, C2, and C3 accessing the same target server S0 (see (1) in FIG. 3).

Then, the matrix generation unit 15b generates the matrix representing server usage states of the clients C1, C2, and C3 (see (2) in FIG. 3). In the example in FIG. 3, the matrix generation unit 15b generates the matrix using binary values of "0" (no access) or "1" (access) in accordance with whether or not the clients have accessed each server. That is, as exemplified in FIG. 3, in the case where a client has accessed a server, "1" is set, and in the case where a client has not accessed a server, "0" is set. For example, because the client C1 has accessed the server Si, the matrix generation unit 15b sets the value of "1" in the element of the matrix corresponding to the server Si and the client C1.

The scheme for generating the matrix is not limited thereto. For example, the matrix generation unit 15b may increase a weight as the number of clients accessing the server decreases. The matrix generation unit 15b may generate the matrix in accordance with the number of accesses of the clients instead of in accordance with whether or not the clients have accessed each server. For example, when a weighting coefficient of the server Si is "0.8" and the number of accesses of the client C1 to the server Si is "20," the matrix generation unit 15b may set a value of "16" obtained by multiplying "0.8" by "20" in the element of the matrix corresponding to the server Si and the client C1. The matrix generation unit 15b may perform weighting using a TF-IDF method as a specific computation scheme.

Subsequently, the feature amount generation unit 15c computes a degree of similarity for the matrix representing the server usage states of two clients (see (3) in FIG. 3). In the example in FIG. 3, the feature amount generation unit 15c computes each correlation coefficient for the matrix representing the states of access of two clients to the server with regard to a pair of C1 and C2, a pair of C2 and C3, and a pair of C1 and C3 which are pairs of two clients accessing the same target server S0.

Thereafter, the feature amount generation unit 15c generates a statistical value of the correlation coefficients of the plurality of pairs of clients as a feature amount of the target server (see (4) in FIG. 3). For example, the feature amount generation unit 15c computes one or a plurality of a mean, a dispersion, a maximum value, a minimum value, and a median of the correlation coefficients as a statistical value of the correlation coefficients and sets the computed statistical value as a feature amount of the target server.

When the number of clients that have accessed the same target server exceeds a predetermined number (for example, 100), the feature amount generation unit 15c may extract a preset number of clients (for example, 100 clients) as a subset and may generate statistical information of similarities between the clients in the subset in the matrix as a feature amount of the target server. Therefore, the feature amount generation unit 15c can reduce a processing load when the number of clients that have accessed the target server is large. It is assumed that the foregoing predetermined number or preset number can be set to any number.

Referring back to FIG. 1, with regard to a target server for which it is known whether the server is a malicious server, the learning unit 15d learns a model for determining whether a server is a malicious server by using the feature amount generated by the feature amount generation unit 15c. For example, with regard to a target server for which there is label information indicating the kind of server, the learning unit 15d learns the model by using the label information and the feature amount generated by the feature amount generation unit 15c.

The learning unit 15d performs machine learning by using the communication feature amount of the malicious server and the communication feature amount of the non-malicious server output from the feature amount generation unit 15c. Then, the learning unit 15d generates a model indicating the communication feature amounts of the malicious server and the non-malicious server using a result of the above-mentioned machine learning. The learned model is assumed to be stored in a predetermined area of the storage unit 14 of the detection device 10. It is assumed that, with regard to a server for which it is known whether the server is a malicious server or a non-malicious server, the detection device 10 can store information in advance and determine whether the target server is a server for which it is known whether the server is a malicious server or a non-malicious server based on the information stored in advance.

With regard to a target server for which it is known whether the server is a malicious server or a non-malicious server, the determination unit 15e determines whether the target server is a malicious server by using the feature amount generated by the feature amount generation unit 15c and the model. For example, the determination unit 15e inputs the feature amount generated by the feature amount generation unit 15c to the target server for which there is no label information and obtains label information of the target server output from the model. When the label information of the target server is a malicious label, the determination unit 15e sets the target server as a malicious server, stores an IP address of the malicious server in the malicious server information storage unit 14a, and performs control such that the IP address of the malicious server is output. The IP address of the malignant server may be output via the above-described output unit 12 or may be output to an external device via the above-described communication unit 13.

Figure 4:
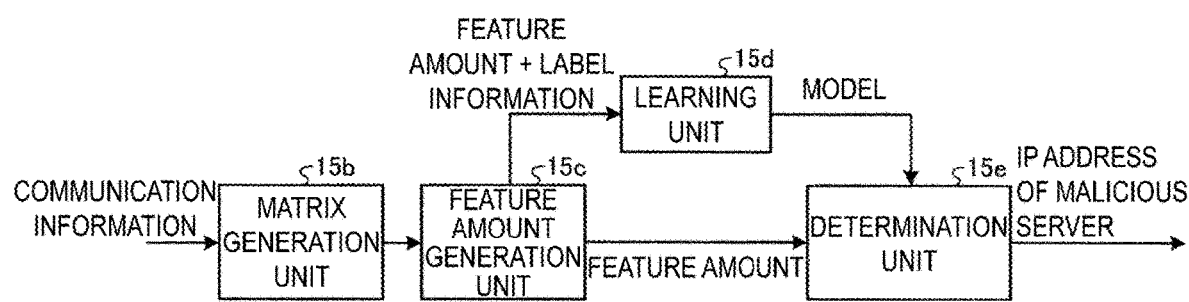
FIG. 4 is a diagram illustrating an overview of learning processing and detection processing.

Here, an overview of learning processing and detection processing will be described with reference to FIG. 4. FIG. 4 is a diagram illustrating an overview of learning processing and detection processing. As exemplified in FIG. 4, the matrix generation unit 15b generates a matrix representing states of access from clients to servers by using input communication information and outputs the matrix to the feature amount generation unit 15c. The feature amount generation unit 15c aggregates a plurality of clients that have accessed a target server and generates statistical information of similarities between the aggregated clients in the matrix as a feature amount of the target server.

When the label information of the target server is known, the learning unit 15d trains the model by performing supervised machine learning by using the feature amount generated by the feature amount generation unit and outputs information regarding the trained model to the determination unit 15e.

With regard to the target server of which the label information is known, the determination unit 15e inputs the feature amount generated by the feature amount generation unit 15c into the model learned by the learning unit 15d and obtains the label information of the target server output from the model. As a result, when the determination unit 15e determines that the target server is a malicious server based on the label information, control is performed such that the IP address of the malicious server is output.

Processing Procedure of Detection Device

Figure 5:
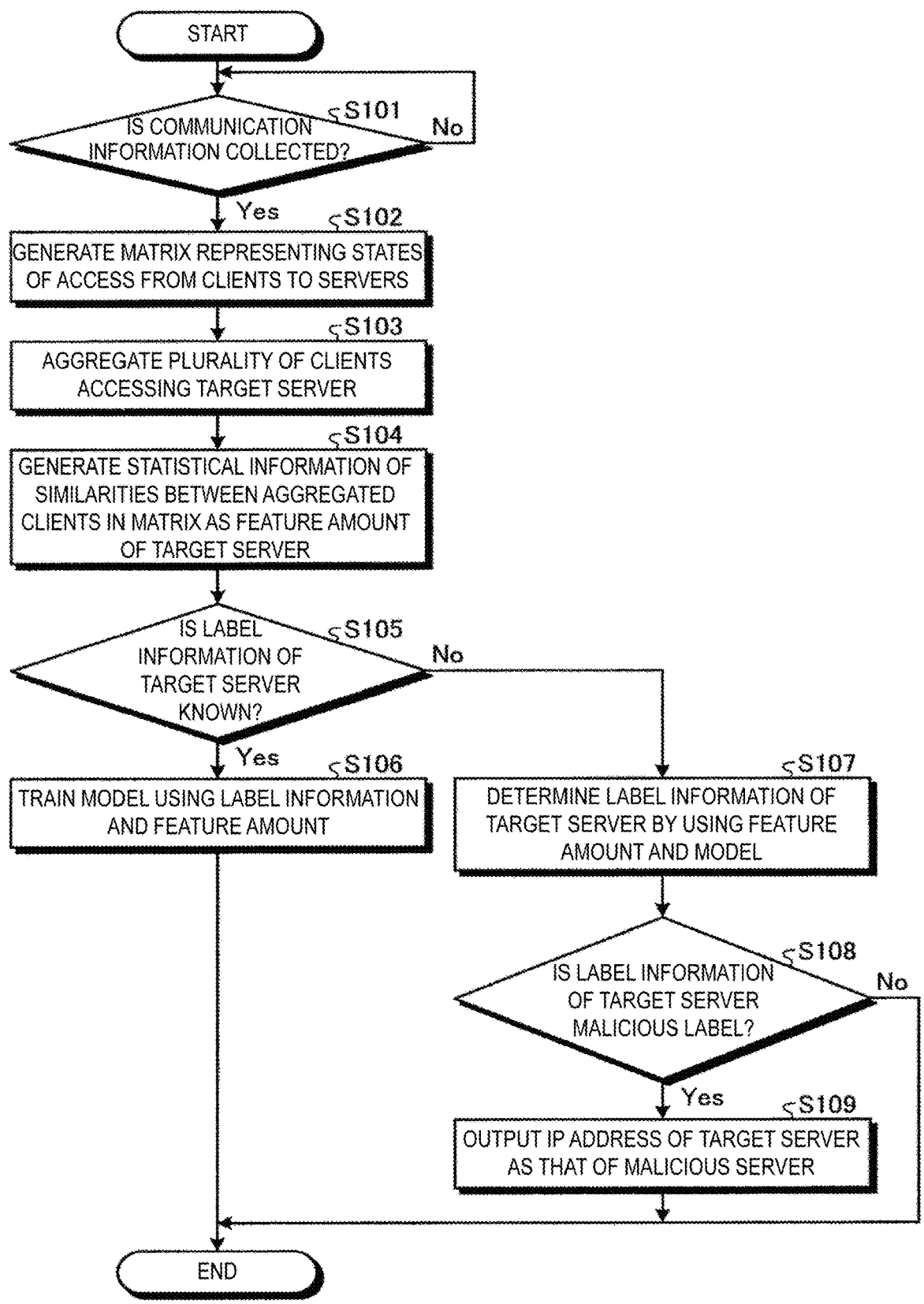
FIG. 5 is a flowchart illustrating an example of a flow of processing in the detection device according to the first embodiment.

Next, an example of a processing procedure performed by the detection device 10 according to the first embodiment will be described with reference to FIG. 5. FIG. 5 is a flowchart illustrating an example of a flow of processing in the detection device according to the first embodiment.

As exemplified in FIG. 5, the collection unit 15a of the detection device 10 collects the communication information (positive in step S101), the matrix generation unit 15b generates a matrix representing the states of access from clients to servers from the communication information collected by the collection unit 15a (step S102). For example, the matrix generation unit 15b generates a matrix in accordance with whether or not clients have accessed each server.

Then, the feature amount generation unit 15c aggregates the plurality of clients that have accessed the target server (step S103). Subsequently, the feature amount generation unit 15c generates statistical information of similarities between the aggregated clients in the matrix as the feature amount of the target server (step S104). For example, the feature amount generation unit 15c sets two clients accessing the same target server as one pair, computes a correlation coefficient for the matrix representing states of access from the two clients to the server for each pair, and computes a statistical value of the correlation coefficients of the plurality of pairs of clients as a feature amount of the server.

Then, the feature amount generation unit 15c determines whether the label information of the target server is known (step S105). As a result, when the feature amount generation unit 15c determines that the label information of the target server is known (positive in step S105), the learning unit 15d trains the model using the label information and the feature amount of the target server (step S106).

Conversely, when the feature amount generation unit 15c determines that the label information of the target server is unknown (negative in step S105), the determination unit 15e determines the label information of the target server by using the feature amount of the target server and the model (step S107). For example, with regard to a target server for which there is no label information, the determination unit 15e inputs the feature amount generated by the feature amount generation unit 15c into the model and obtains label information of the target server output from the model. Then, the determination unit 15e determines whether the label information of the target server is a label indicating a malicious server (a malicious label).

As a result, when the determination unit 15e determines that the label information of the target server is a malicious label (positive in step S108), the determination unit 15e sets the target server as a malicious server and outputs the IP address of the malicious server (step S109). Conversely, when the determination unit 15e determines that the label information of the target server is not a malicious label (negative in step S108), the processing ends as is. In the example in FIG. 5, the learning processing and the detection processing have been described as processing on the same flow, but the learning processing and the detection processing may be performed as separate processing. That is, the detection device 10 may, after the learning processing has been generated in advance and the model has been generated, perform the detection processing using the generated model.

Effects of First Embodiment

In this way, the detection device 10 according to the first embodiment collects communication information in a network including clients and servers and generates a matrix representing states of access from the clients to the servers by using the collected communication information. The detection device 10 aggregates the plurality of clients accessing a target server and generates statistical information of similarities between the aggregated clients in the matrix as a feature amount of the target server. Subsequently, with regard to the target server which is a server for which it is known whether the server is a malicious server, the detection device 10 learns a model for determining whether a server is a malicious server using the generated feature amount. With regard to a target server for which it is unknown whether the server is a malicious server, the detection device 10 determines whether the target server is a malicious server by using the generated feature amount and the model.

Therefore, in the detection device 10 according to the first embodiment, it is possible to improve detection accuracy for detecting a malicious server that controls clients infected with malware. That is, in the detection device 10 according to the first embodiment, by focusing on the objectives of the clients, assuming that the clients accessing the same regular server are a group of clients that have the same objective (interest), extracting from communication information a feature amount group such as similarity of taste between the clients when using a site, and applying the feature amount group to supervised learning, it is possible to distinguish between an authorized server and an unauthorized server and improve the detection precision.

Other Embodiments

In the above-described first embodiment, as described above, the detection device 10 performs both the learning processing and the detection processing; however, the present invention is not limited thereto. Other devices may perform the learning processing and the detection processing. For example, a learning device that performs the learning processing may perform supervised machine learning and generate a model, and a detection device may detect a malicious server by using the model generated by the learning device.

In this case, the learning device includes the collection unit 15a, the matrix generation unit 15b, the feature amount generation unit 15c, and the learning unit 15d of the above-described control unit 15, and the detection device includes the collection unit 15a, the matrix generation unit 15b, the feature amount generation unit 15c, and the determination unit 15e of the control unit 15.

Figure 6:
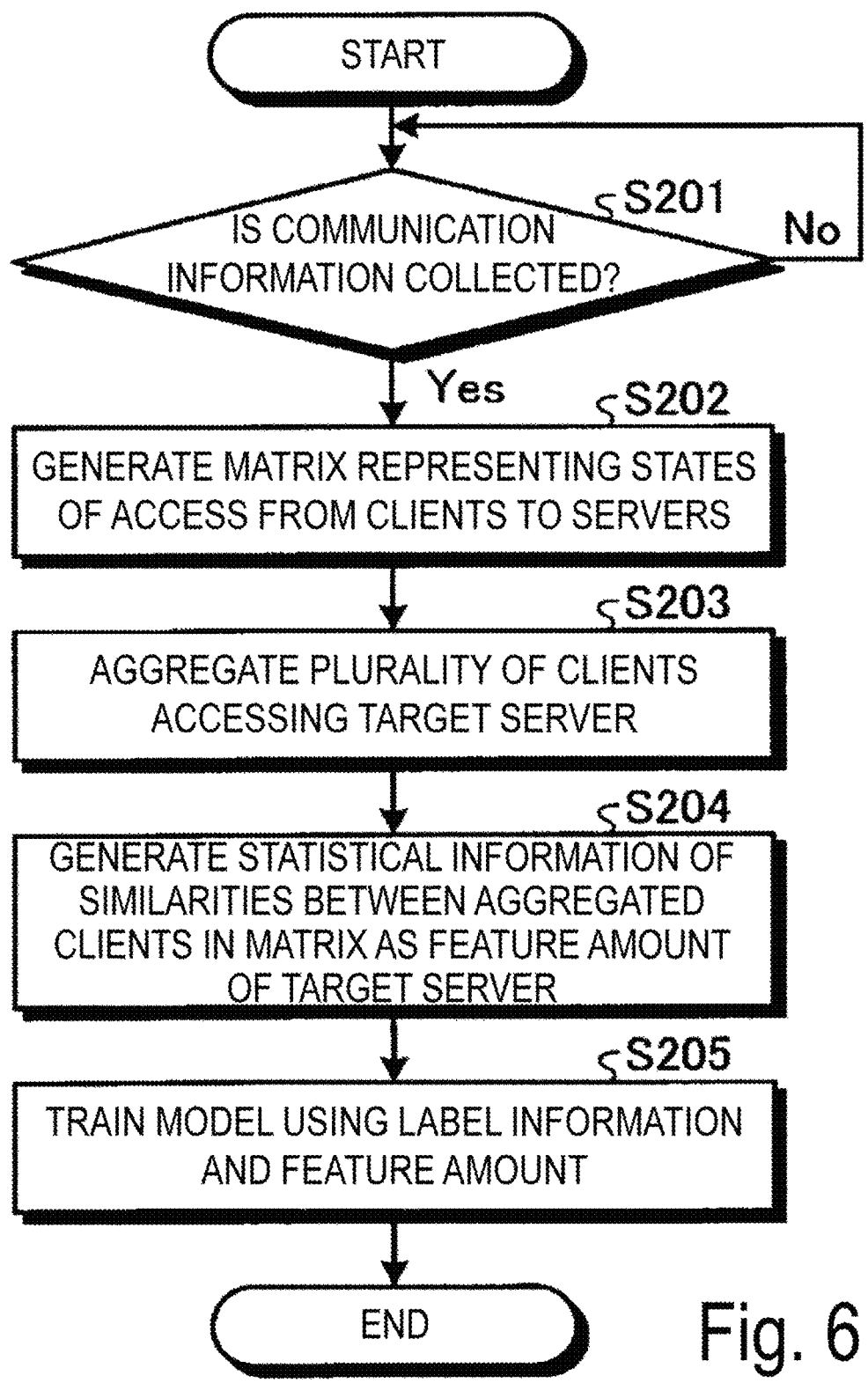
FIG. 6 is a flowchart illustrating an example of a flow of processing in a learning device according to another embodiment.
Figure 7:
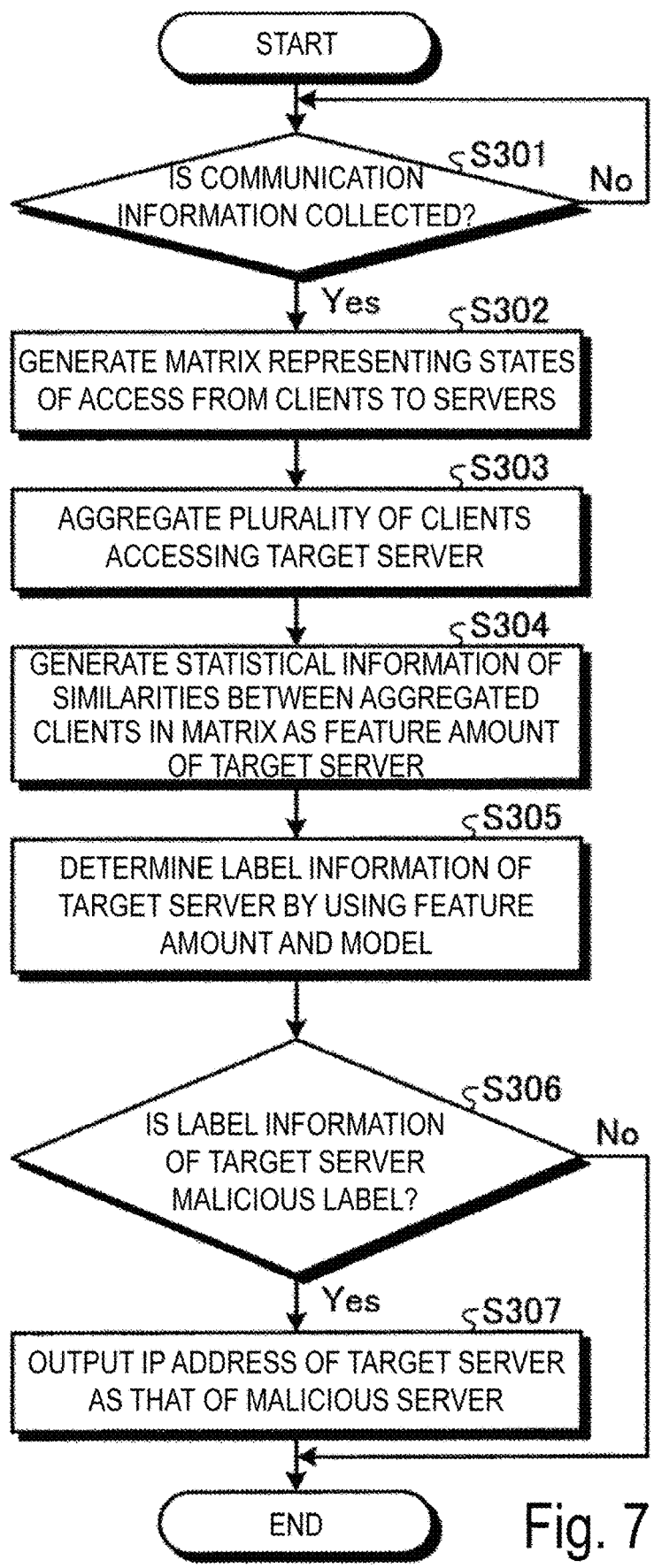
FIG. 7 is a flowchart illustrating an example of a flow of processing in a detection device according to still another embodiment.

Hereinafter, a flow of processing in the learning device according to another embodiment will be described with reference to FIG. 6. A flow of processing in the detection device according to still another embodiment will be described with reference to FIG. 7. FIG. 6 is a flowchart illustrating an example of a flow of processing in the learning device according to another embodiment. FIG. 7 is a flowchart illustrating an example of a flow of processing in the detection device according to still another embodiment.

As illustrated in FIG. 6, when the collection unit 15a of the learning device according to another embodiment collects communication information (positive in step S201), the matrix generation unit 15b generates a matrix representing states of access from clients to servers from the communication information collected by the collection unit 15a (step S202). For example, the matrix generation unit 15b generates a matrix in accordance with whether or not clients have accessed each server.

Then, the feature amount generation unit 15c aggregates a plurality of clients that have accessed a target server (step S203). Subsequently, the feature amount generation unit 15c generates statistical information of similarities between the aggregated clients in the matrix as the feature amount of the target server (step S204). For example, the feature amount generation unit 15c sets two clients accessing the same target server as one pair, computes a correlation coefficient for the matrix representing states of access from the two clients to the server for each pair, and computes a statistical value of the correlation coefficients of the plurality of pairs of clients as a feature amount of the target server.

Then, the learning unit 15d trains the model by using the label information of the target server and the feature amount of the target server (step S205). Here, the label information of the target server is assumed to be known. That is, the learning unit 15d generates the model by machine learning using the feature amount generated in step S204.

Next, a sequence in which the detection device according to still another embodiment detects a malicious server by using the model generated by the learning device will be described with reference to FIG. 7. As illustrated in FIG. 7, the collection unit 15a of the detection device according to still another embodiment collects the communication information (positive in step S301), the matrix generation unit 15b generates a matrix representing states of access from clients to servers from the communication information collected by the collection unit 15a (step S302). For example, the matrix generation unit 15b generates a matrix in accordance with whether or not clients have accessed each server.

Then, the feature amount generation unit 15c aggregates a plurality of clients that have accessed a target server (step S303). Subsequently, the feature amount generation unit 15c generates statistical information of similarities between the aggregated clients in the matrix as a feature amount of the target server (step S304). For example, the feature amount generation unit 15c sets two clients accessing the same target server as one pair, computes a correlation coefficient for the matrix representing states of access from the two clients to the server for each pair, and computes a statistical value of the correlation coefficients of the plurality of pairs of clients as a feature amount of the server.

Then, the determination unit 15e determines the label information of the target server by using the feature amount of the target server and the model (step S305). For example, with regard to a target server for which there is no label information, the determination unit 15e inputs the feature amount generated by the feature amount generation unit 15c into the model and obtains label information of the target server output from the model. Then, the determination unit 15e determines whether the label information of the target server is a label indicating a malicious server (a malicious label).

As a result, when the determination unit 15e determines that the label information of the target server is a malicious label (positive in step S306), the determination unit 15e sets the target server as a malicious server and outputs the IP address of the malicious server (step S307). Conversely, when the determination unit 15e determines that the label information of the target server is not a malicious label (negative in step S306), the processing ends as is.

System Configuration and the Like

In addition, components of the devices illustrated in the drawings are functionally conceptual and are not necessarily physically configured as illustrated in the drawings. That is, the specific aspects of distribution and integration of the devices are not limited to those illustrated in the drawings. All or some of the components may be distributed or integrated functionally or physically in desired units depending on various kinds of loads, states of use, and the like. Further, all or some of the processing functions performed by the devices can be implemented by a CPU and a program analyzed and executed by the CPU, or be implemented as hardware based on a wired logic.

In addition, all or some of the processing operations described as automatically performed processing operations out of the processing operations described in the present embodiment may be performed manually. Alternatively, all or some of the processing operations described as manually performed processing operations may be performed automatically by a known method. Furthermore, the processing procedures, the control procedures, the specific names, and the information including various types of data and parameters described in the present specification and the drawings can be optionally changed unless otherwise mentioned.

Program

FIG. 8 is a diagram illustrating a computer that executes a detection program. A computer 1000 includes, for example, a memory 1010 and a CPU 1020. In addition, the computer 1000 includes a hard disk drive interface 1030, a disk drive interface 1040, a serial port interface 1050, a video adapter 1060, and a network interface 1070. These units are connected to each other through a bus 1080.

The memory 1010 includes a read only memory (ROM) 1011 and a RAM 1012. The ROM 1011 stores a boot program such as, for example, a basic input output system (BIOS). The hard disk drive interface 1030 is connected to a hard disk drive 1090. The disk drive interface 1040 is connected to a disk drive 1100. A removable storage medium such as, for example, a magnetic disc or an optical disc is inserted into the disk drive 1100. The serial port interface 1050 is connected to, for example, a mouse 1051 and a keyboard 1052. The video adapter 1060 is connected to, for example, a display 1061.

The hard disk drive 1090 stores, for example, an OS 1091, an application program 1092, a program module 1093, and program data 1094. That is, a program defining each processing performed by the detection device 10 is mounted as the program module 1093 in which computer executable codes are described. The program module 1093 is stored in, for example, the hard disk drive 1090. For example, the program module 1093 for executing the same processing as that performed by the functional configuration in the device is stored in the hard disk drive 1090. The hard disk drive 1090 may be replaced with a solid state drive (SSD).

In addition, the data used for the processing of the above-described embodiment is stored in, for example, the memory 1010 or the hard disk drive 1090 as the program data 1094. The CPU 1020 reads out and executes the program module 1093 or the program data 1094 stored in the memory 1010 and the hard disk drive 1090, as necessary, in the RAM 1012.

The program module 1093 and the program data 1094 are not necessarily stored in the hard disk drive 1090, and may be stored in, for example, a removable storage medium and be read out by the CPU 1020 through the disk drive 1100 or the like. Alternatively, the program module 1093 and the program data 1094 may be stored in another computer connected through a network or a wide area network (WAN). The program module 1093 and the program data 1094 may be read out by the CPU 1020 from another computer through the network interface 1070.

REFERENCE SIGNS LIST

10 Detection device
11 Input unit
12 Output unit
13 Communication unit
14 Storage unit
14a Malicious server information storage unit
15 Control unit
15a Collection unit
15b Matrix generation unit
15c Feature amount generation unit
15d Learning unit
15e Determination unit

The invention claimed is:

1. A detection device comprising:
processing circuitry configured to:
collect communication information in a network including clients and servers;
generate a matrix representing states of access from the clients to the servers using the communication information collected;
aggregate a plurality of the clients accessing a target server and generate statistical information of similarities between the aggregated clients in the matrix as a feature amount of the target server;
generate, with regard to the target server which is a server for which it is unknown whether the target server is a malicious server, a model for determining whether the target server is a malicious server by performing machine learning using the feature amount generated; and
determine, with regard to the target server, whether the target server is a malicious server using the feature amount generated and the model,
wherein the processing circuitry is further configured to compute a global significance for each of the servers using a number of the clients accessing each of the servers, compute a local significance for each of the servers with respect to each of the clients using a number of accesses to each of the servers for each of the clients, and generate the matrix in accordance with the global significance and the local significance.

2. The detection device according to claim 1, wherein the processing circuitry is further configured to generate the matrix in accordance with whether or not the clients have accessed each server.

3. The detection device according to claim 1, wherein the processing circuitry is further configured to set two clients accessing a same target server as one pair, compute correlation coefficients for the matrix representing states of access from the two clients to the same target server for each pair, and compute a statistical value of the correlation coefficients of a plurality of pairs of clients as a feature amount of the same target server.

4. The detection device according to claim 1, wherein, when a number of the clients accessing a same target server exceeds a predetermined number, the processing circuitry is further configured to extract a preset number of the clients as a subset and generate statistical information of similarities between the clients in the matrix in the subset as a feature amount of the same target server.

5. A detection method performed by a detection device, the detection method comprising:
collecting communication information in a network including clients and servers;
generating a matrix representing states of access from the clients to the servers using the communication information collected in the collecting of the communication information;
aggregating a plurality of the clients accessing a target server and generating statistical information of similarities between the aggregated clients in the matrix as a feature amount of the target server;
generating, with regard to the target server for which it is unknown whether the target server is a malicious server, a model for determining whether the target server is a malicious server by performing machine learning using the feature amount generated in the generating of the feature amount;
determining, with regard to the target server, whether the target server is a malicious server using the feature amount generated in the generating of the feature amount and the model;
setting two clients accessing a same target server as one pair;
computing correlation coefficients for the matrix representing states of access from the two clients to the same target server for each pair; and
computing a statistical value of the correlation coefficients of a plurality of pairs of the clients as a feature amount of the same target server.

6. A non-transitory computer-readable recording medium storing therein a detection program that causes a computer to execute a process comprising:
collecting communication information in a network including clients and servers;
generating a matrix representing states of access from the clients to the servers using the communication information collected in the collecting of the communication information;
aggregating a plurality of the clients accessing a target server and generating statistical information of similarities between the aggregated clients in the matrix as a feature amount of the target server;
generating, with regard to the target server for which it is unknown whether the target server is a malicious server, a model for determining whether the target server is a malicious server by performing machine learning using the feature amount generated in the generating of the feature amount;
determining, with regard to the target server, whether the target server is a malicious server using the feature amount generated in the generating of the feature amount and the model; and
extracting a preset number of the clients as a subset and generating statistical information of similarities between the clients in the matrix in the subset as a feature amount of a same target server, when a number of the clients accessing the same target server exceeds a predetermined number.

* * * * *